United States Patent Office 3,004,991
Patented Oct. 17, 1961

3,004,991
PROCESS AND INTERMEDIATES FOR PREPARATION OF 17α-ACYLOXY-6α-METHYLPREGN-4-ENE-3:20-DIONES
Vladimir Petrow, London, England, assignor to The British Drug Houses Limited, London, England, a British company
No Drawing. Filed Sept. 23, 1958, Ser. No. 762,712
Claims priority, application Great Britain Oct. 2, 1957
12 Claims. (Cl. 260—397.4)

This invention is for improvements in or relating to organic compounds and has particular reference to the preparation of new 17α-acyloxy-6α-methylpregn-4-ene-3:20-diones and their hydrolysis to 17α-hydroxy-6α-methylpregn-4-ene-3:20-dione.

It is an object of the present invention to provide new 17α-acyloxy-6α-methylpregn-4-ene-3:20-diones (having the general Formula I below where R is an acyl group containing up to 10 carbon atoms) which are of value on account of their progestational properties. In particular the invention provides the new compounds:

17α-caproyloxy-6α-methylpregn-4-ene-3:20-dione,
17α-caproxy-6α-methylpregn-4-ene-3:20-dione, which are of value on account of their progestational properties and as intermediates in the preparation of 17α-hydroxy-6α-methylpregn-4-ene-3:20-dione, 17α-hydroxy-6α-methylpregn-4-ene-3:20-dione, which is of value as an intermediate in the preparation of biologically active compounds, such as, for example, the highly progestational 17α-acyl derivatives.

The invention also provides the following new intermediates:

17α-acetoxy-3β-hydroxy-6-methylpregn-5-en-20-one,
17α-propionoxy-3β-hydroxy-6-methylpregn-5-en-20-one,
17α-caproyloxy-3β-hydroxy-6-methylpregn-5-en-20-one,
17α-caproxy-3β-hydroxy-6-methylpregn-5-en-20-one.
3β-acetoxy-16α:17α-epoxy-6-methylpregn-5-en-20-one,
3β-acetoxy-17α-hydroxy-6-methylpregn-5-en-20-one,
3β:17α-diacetoxy-6-methylpregn-5-en-20-one,
3β-hydroxy-17α-acetoxy-6-methylpregn-5-en-20-one,
3β-hydroxy-16α:17α-epoxy-6-methylpregn-5-en-20-one,
3β:17α-dihydroxy-6-methylpregn-5-en-20-one.

According to the present invention there is provided a process for the preparation of a 17α-acyloxy-6α-methylpregn-4-ene-3:20-dione having the general formula

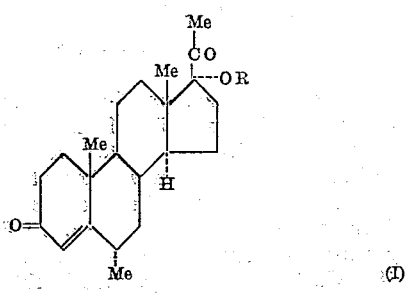

(where R is an acyl group containing up to 10 carbon atoms), which process comprises oxidising a 3β-hydroxyor 3β-acyloxy-6-methylpregna-5:16-dien-20-one having the general formula

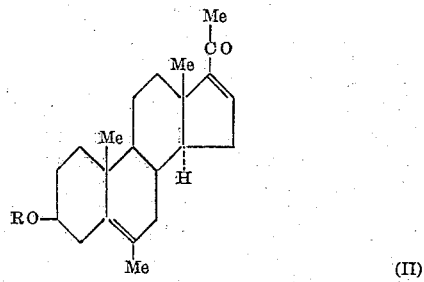

(where R is hydrogen or an acyl group containing up to 10 carbon atoms) to the corresponding 16α:17α-epoxide having the general formula

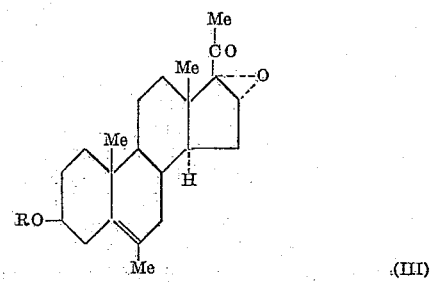

(where R is hydrogen or an acyl group containing up to 10 carbon atoms), acylating the 16α:17α-epoxide, converting it into a 16β-halogeno-17α-hydroxy derivative by treatment with a hydrogen halide, reductively dehalogenating the resulting product to a 3β-acyloxy-17α-hydroxy-6-methylpregn-5-en-20-one having the general formula

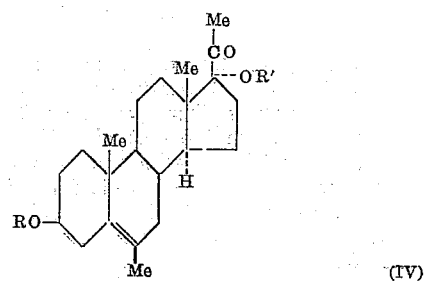

(where R is an acyl group containing up to 10 carbon atoms and R' is hydrogen), acylating the 17α-hydroxyl group to give the corresponding 3β-acyloxy-17α-acyloxy-6-methylpregn-5-en-20-one (having the general Formula IV above where R and R' are acyl groups containing up to 10 carbon atoms), preferentially hydrolysing the 3β-acyloxy group to give 17α-acyloxy-3β-hydroxy-6-methylpregn-5-en-20-one and oxidising the latter compound.

The resulting 17α-acyloxy-6α-methylpregn-4-ene-3:20-dione may be converted by saponification into 17α-hydroxy-6α-methylpregn-4-ene-3:20-dione (I; R=H).

In carrying out the above mentioned process, it is convenient to employ 3β-acetoxy-6-methylpregna-5:16-dien-20-one (II; R=Ac) as starting material, the preparation of which has been described in our copending application Ser. No. 755,368. Oxidation of this material to the 16α:17α-epoxide (III; R=Ac) may be effected by treating compound II with hydrogen peroxide in an alcoholic solution made alkaline with a hydroxide such as sodium or potassium hydroxide. The reaction proceeds readily at 0° C., but may be accelerated by employing temperatures up to the boiling point of the alcohol used as solvent. Partial or complete saponification of the 3β-acetoxy group may occur during this reaction; acylation, preferably acetylation, of the total product is therefore necessary in order to ensure isolation of pure 3β-acetoxy-16α:17α-epoxy-6-methylpregn-5-en-20-one (III; R=Ac) in reasonable yield.

Conversion of the epoxide (III; R=Ac) into the 16β-halogeno:17α-hydroxy derivative may be accomplished by treating the epoxide in a solvent, such as, for example, dioxan or acetic acid, with a hydrogen halide at temperatures at or below 25° C. In general, it is not necessary to purify this intermediate before proceeding with the next stage of the process. The crude product may then be reductively dehalogenated with, for example, Raney nickel in ethanol at temperatures in the region of room temperature (ca. 25° C.) to give 3β-acetoxy-17α-hydroxy-6-methylpregn-5-en-20-one (IV; R=Ac; R'=H).

Acylation of the tertiary hydroxyl group present in the latter compound may be achieved by methods well-known to those skilled in the art. Such methods include, for example, treatment of the compound with an acid anhydride and a catalytic quantity of toluene-p-sulphonic acid for several hours at somewhat elevated temperatures. Hydrolysis of the resulting 3β-acetoxy-17α-acyloxy-6-methylpregn-5-en-20-one (IV; R=Ac, R'=acyl) may best be effected with hot ethanolic or methanolic hydrochloric acid, when the 17α-acyloxy-3β-hydroxy-6-methylpregn-5-en-20-one (IV; R=H; R'=acyl) is obtained. Conversion of the latter compound into the required 17α-acyloxy-6α-methylpregn-4-ene-3:20-dione (I; R=acyl) may conveniently be achieved by an oxidation of the Oppenauer type, employing, for example, toluene as solvent, cyclohexanone as hydrogen acceptor, and an aluminium alkoxide in suitable proportions. Careful saponification of the foregoing product (I; R=acyl) with, for example, alcoholic alkali furnishes 17α-hydroxy-6α-methylpregn-4-ene-3:20-dione (I; R=H).

Following is a description by way of example of methods of carrying the invention into effect:

*Example 1*

3β-acetoxy-6-methylpregna-5:16-dien-20-one (5 g.) in methanol (400 ml.) was treated for 18 hours at 0° C. with 4 N aqueous sodium hydroxide (10 ml.) and aqueous hydrogen peroxide (20 ml.) of 30%. The product obtained by precipitation with water was washed, dried, and treated with a mixture of acetic anhydride (15 ml.) and pyridine (15 ml.) for 1 hour at 100° C. Addition of water gave a solid which was washed, dried, and crystallised from acetone/hexane. 3β-acetoxy-16α:17α-epoxy-6-methylpregn-5-en-20-one separated in needles, or prisms, M.P. 136° to 137° C., $[\alpha]_D^{24}$ —18° (c., 0.25 in chloroform).

The foregoing epoxide (2 g.) in dioxan (100 ml.) was treated with aqueous hydrogen iodide (17 ml. of 55%) for 30 minutes in the dark. The solids obtained on pouring the mixture into cold water were dissolved in ethanol (150 ml.), and the solution agitated with Raney nickel sludge (ca. 12 g.) for 30 minutes at room temperature in the dark. The product was isolated with benzene and chromatographed on alumina. Elution with benzene and with benzene/ether (1:1) gave material which was crystallised from acetone/hexane. 3β-acetoxy-17α-hydroxy-6-methylpregn-5-en-20-one formed needles, M.P. 133° to 134° C., $[\alpha]_D^{24}$ —88° (c., 0.22 in chloroform).

The foregoing compound (0.6 g.) was treated with n-caproic anhydride (13 ml.) and toluene-p-sulphonic acid (0.33 g.) for 20 hours at 45° C. Aqueous pyridine was added, the mixture steam-distilled for 1 hour, and the product isolated with ether. Purification from methanol gave 3β-acetoxy-17α-caproyloxy-6-methylpregn-5-en-20-one, needles or plates, M.P. 111° to 112° C., $[\alpha]_D^{24}$ —51° (c., 0.16 in chloroform).

The foregoing ester (420 mg.) was heated under reflux for 1 hour with methanol (30 ml.) and concentrated hydrochloric acid (2 drops). Concentration in vacuo, followed by the careful addition of water gave 17α-caproyloxy-3β-hydroxy-6-methylpregn-5-en-20-one, needles, M.P. 152° C., $[\alpha]_D^{24}$ —59° (c., 0.34 in chloroform).

A solution of the foregoing compound (300 mg.) in toluene (6 ml.) and cyclohexanone (9.5 ml.) was treated with aluminium tert.-butoxide (300 mg.) and the mixture refluxed for 30 minutes. After the addition of aqueous Rochelle salt, the mixture was steam-distilled and the product isolated with chloroform. 17α-caproyloxy-6α-methylpregn-4-ene-3:20-dione was obtained as crystals, M.P. 90 to 94° $[\alpha]_D^{22}$ +40° (c., 0.92 in chloroform), $\lambda_{max}$. 240 mµ (log ε=4.18).

A solution of the foregoing compound in methanol (10 ml.) under nitrogen was refluxed whilst potassium hydroxide (70 mg.) in methanol (5 ml.) and water (2 ml.) was added dropwise over 20 minutes. The mixture was refluxed for 2 hours, cooled, acidified with acetic acid, and the product isolated with chloroform. It crystallised from acetone/hexane to give 17α-hydroxy-6α-methylpregn-4-ene-3:20-dione, prisms, M.P. 220° to 222° C., $[\alpha]_D^{22}$ +78° (c., 1.04 in chloroform). Some samples of this compound melted at 264° C., but were otherwise identical (optical rotation and infra-red spectrum) with the lower-melting variety.

*Example 2*

3β-acetoxy-17α-hydroxy-6-methylpregn-5-en-20-one was prepared as described in Example 1. This compound (1 g.) in benzene (25 ml.) was treated with toluene-p-sulphonic acid (200 mg.) and capric anhydride (2 ml.), and the mixture heated under reflux for 1 hour. When cool, water was added, the mixture stirred for 2 hours and the product isolated with ether. It was dissolved in methanol (15 ml.) and the solution treated with concentrated hydrochloric acid (2 drops). The mixture was refluxed for 1 hour, cooled, and the product isolated by extraction with ether. It was purified from light petroleum (boiling range 40 to 60°) to give needles of 17α-caproxy-3β-hydroxy-6-methylpregn-5-en-20-one, M.P. 95° C., $[\alpha]_D^{23}$ —58° (c., 1.02 in chloroform).

The foregoing compound (0.75 g.) in dry toluene (30 ml.) and cyclohexanone (7 ml.) was treated with aluminium isopropoxide (350 mg.) in toluene (10 ml.), and the mixture refluxed for 1 hour. After the addition of aqueous Rochelle salt, the mixture was steam-distilled and the product isolated with ether. There was obtained 17α-caproxy-6α-methylpregn-4-ene-3:20-dione, an oil, $\lambda_{max}$. 240 mµ (log ε=4.18).

*Example 3*

3β-acetoxy-17α-hydroxy-6-methylpregn-5-en-20-one (2 g.) (prepared as described in Example 1) in acetic anhydride (20 ml.) was treated with toluene-p-sulphonic acid (1 g.). The mixture was kept at 30° C. for 24 hours, poured into water, and the precipitated solids crystallised from aqueous methanol. 3β:17α-diacetoxy-6-methylpregn-5-en-20-one separated in needles, M.P. 188° to 189° C., $[\alpha]_D^{28}$ —76° (c., 1.16 in chloroform).

The foregoing compound (1 g.) in methanol (50 ml.) to which concentrated hydrochloric acid (2 drops) had been added, was heated under reflux for 1 hour. The solvent was partially removed in vacuo, and water carefully added. 17α-acetoxy-3β-hydroxy-6-methylpregna-5-en-20-one crystallised in needles, M.P. 219 to 222° C., $[\alpha]_D^{22}$ —72° (c., 0.92 in chloroform).

The foregoing compound (3.4 g.) in toluene (150 ml.) and cyclohexanone (35 ml.) was heated under reflux, and treated with aluminium isopropoxide (3.4 g.) in toluene (50 ml.). The mixture was refluxed for 2 hours, cooled, aqueous Rochelle salt was added, and the solvents removed by steam-distillation. The solid product was crystallised from acetone/hexane to give 17α-acetoxy-6α-methylpregn-4-ene-3:20-dione, plates, M.P. 205 to 208° C., $[\alpha]_D^{21}$ +51° (c., 1.2 in chloroform).

*Example 4*

3β-acetoxy-17α-hydroxy-6-methylpregn-5-en-20-one (1 g.) in benzene (25 ml.) was treated with toluene-p-sulphonic acid (200 mg.) and propionic anhydride (1 mil.), and the mixture refluxed for 1 hour. Water was added, the mixture shaken for 4 hours and the product isolated with ether. Crystallisation from hexane gave 3β-acetoxy-17α-propionoxy-6-methylpregn-5-en-20-one, plates, M.P. 182° C., $[\alpha]_D^{23}$ —77° (c., 0.74 in chloroform).

The foregoing compound (4 g.) in methanol (150 ml.) containing 8 drops of concentrated hydrochloric acid was heated under reflux for 1 hour. Addition of water gave 17α-propionoxy-3β-hydroxy-6-methylpregn-5-en-20-one, needles, M.P. 170 to 172° C., $[\alpha]_D^{23}$ —69° (c., 0.94 in chloroform).

The foregoing compound (1.5 g.) in toluene (60 ml.) and cyclohexanone (14 ml.) was treated with aluminium isopropoxide (1 g.) in toluene (20 ml.) and the mixture refluxed for 1 hour. After the addition of aqueous Rochelle salt, the mixture was steam-distilled and the product isolated with ether. Crystallisation gave 17α-propionoxy-6α-methylpregn-4-ene-3:20-dione, M.P. 154 to 155° C.

*Example 5*

3β-acetoxy-6-methylpregna-5:16-dien-20-one (20 g.) in boiling methanol (250 ml.) was treated with aqueous sodium hydroxide (40 ml. of 40%), followed immediately by hydrogen peroxide (40 ml. of 30%) added dropwise over five minutes. The mixture was refluxed for twenty minutes, poured into water, and the solids collected and purified from aqueous ethanol. 16α:17α-epoxy-3β-hydroxy-6-methylpregn-5-en-20-one hydrate formed plates, M.P. 180 to 182° C., $[\alpha]_D^{23}$ —8° (c., 0.94 in chloroform).

The foregoing compound (12 g.) in dioxan (400 ml.) was treated for thirty minutes with aqueous hydrogen iodide (84 ml. of 55%). The mixture was poured into water (3 l.) and the precipitate collected and washed neutral. Its solution in ethanol (500 ml.) was mechanically shaken for thirty minutes with Raney nickel sludge (ca. 120 g.), the nickel removed by filtration and the filtrate taken to dryness under reduced pressure. Trituration of the residue with ether gave a solid which was purified from acetone/hexane. 3β:17α - dihydroxy - 6-methylpregn-5-en-20-one hydrate formed needles, M.P. 221 to 222° C., $[\alpha]_D^{22}$ —85° (c., 0.95 in chloroform). Acetylation of this compound in pyridine gave 3β-acetoxy-17α-hydroxy-6-methylpregn-5-en-20-one, needles (from acetone/hexane), M.P. 133 to 134° C., not depressed in admixture with a specimen prepared as described in Example 1.

I claim:

1. 17α-acetoxy-3β-hydroxy-6-methylpregn-5-en-20-one.
2. 17α - propionoxy - 3β - hydroxy - 6 - methylpregn-5 - en - 20 - one.
3. 17α - caproyloxy - 3β - hydroxy - 6 - methylpregn-5 - en - 20 - one.
4. 17α - caproxy - 3β - hydroxy - 6 - methylpregn-5 - en - 20 - one.
5. A process for the preparation of a 17α-acyloxy-6α-methylpregn-4-ene-3:20-dione having the general formula

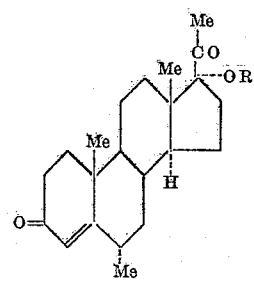

(I)

where R is an acyl group derived from an aliphatic hydrocarbon carboxylic acid containing up to 10 carbon atoms, which process comprises oxidising a steroid selected from the group consisting of 3β-hydroxy- and 3β-acyloxy-6-methylpregna-5:16-dien-20-one having the general formula

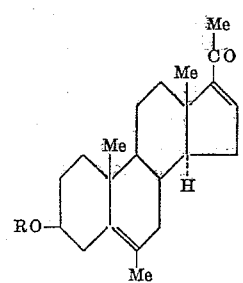

(II)

where R is a group selected from the class consisting of hydrogen and acyl groups derived from an aliphatic hydrocarbon carboxylic acid containing up to 10 carbon atoms to the corresponding 16α:17α-epoxide having the general formula

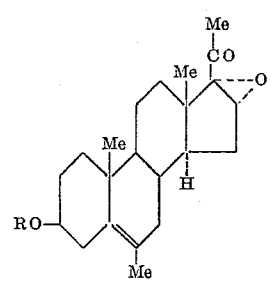

(III)

where R is a group selected from the class consisting of hydrogen and acyl groups derived from an aliphatic hydrocarbon carboxylic acid containing up to 10 carbon atoms, acylating said 16α:17α-epoxide, converting it into a 16β-halogeno-17α-hydroxy derivative by treatment with a hydrogen halide, reductively dehalogenating the resulting product to a 3β-acyloxy-17α-hydroxy-6-methylpregn-5-en-20-one having the general formula

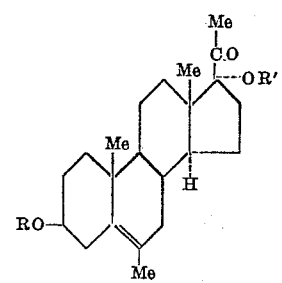

(IV)

where R is an acyl group derived from an aliphatic hydrocarbon carboxylic acid containing up to 10 carbon atoms and R' is hydrogen, acylating the 17α-hydroxyl group to give the corresponding 3β-acyloxy-17α-acyloxy-6-methylpregn-5-en-20-one having the general formula IV above and where R and R' are acyl groups derived from an aliphatic hydrocarbon carboxylic acid containing up to 10 carbon atoms, preferentially hydrolysing the 3β-acyloxy group to give 17α-acyloxy-3β-hydroxy-6-methylpregn-5-en-20-one and oxidising the latter compound.

6. A process as claimed in claim 5 wherein said 3β-acyloxy-6-methylpregna-5:16-dien-20-one is oxidised to the corresponding 16α:17α-epoxide by treatment with hydrogen peroxide in alkaline alcoholic solution.

7. A process as claimed in claim 5 wherein said 16α:17α-epoxide is converted into said 16β-halogeno-17α-hydroxy derivative by treatment in a solvent with hydrogen iodide at a temperature less than 25° C.

8. A process as claimed in claim 5 wherein the reductive dehalogenation is effected with Raney nickel in ethanol at approximately room temperature.

9. A process as claimed in claim 5 wherein acylation of the 17α-hydroxyl group is effected by treatment with an acid anhydride and a catalytic quantity of toluene-p-sulphonic acid.

10. A process as claimed in claim 5 wherein said 17α-acyloxy-3β-hydroxy-6-methylpregn-5-en-20-one is subjected to Oppenauer oxidation to provide said 17α-acyloxy-6α-methylpregn-4-ene-3:20-dione.

11. A compound of the formula

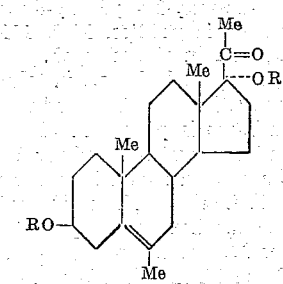

wherein R and R' are members of the class consisting of hydrogen and acyl radicals derived from aliphatic hydrocarbon carboxylic acids containing up to 10 carbon atoms.

12. 3β - acetoxy - 17α - hydroxy - 6 - methylpregn-5-en-20-one.

References Cited in the file of this patent
UNITED STATES PATENTS
2,648,662   Julian _____ Aug. 11, 1953
FOREIGN PATENTS
761,114   Great Britain _____ Nov. 7, 1956
OTHER REFERENCES
Badcock et al.: J.A.C.S., vol. 80, pages 2904–5 (June 5, 1958).